United States Patent [19]
Treiber

[11] 3,989,929
[45] Nov. 2, 1976

[54] APPLICATION OF HUMAN READABLE AND MACHINE READABLE LABELS

[75] Inventor: Fritz F. Treiber, Dayton, Ohio

[73] Assignee: Hobart Corporation, Troy, Ohio

[22] Filed: Apr. 30, 1975

[21] Appl. No.: 573,595

[52] U.S. Cl. .............................................. 235/61.9 R
[51] Int. Cl.$^2$ .............................................. G06K 3/00
[58] Field of Search .................. 235/151.33, 61.9 R, 235/61.6 R

[56] References Cited

UNITED STATES PATENTS 3,891,492 6/1975 Watson .............................. 156/351

*Primary Examiner*—Daryl W. Cook
*Attorney, Agent, or Firm*—Biebel, French & Nauman

[57] ABSTRACT

A system for weighing and labeling random weight packages of commodities includes a weighing scale, a price computer, and printers for printing both human readable and machine readable information. A commodity key includes a printing area for reproducing readable commodity identification and coded identification which is used to produce machine readable commodity identification. Entry of the key into the human readable printer also enters the coded identification. A second computer coacts with the machine readable label printer to produce a unique check character which is included in the printed information. Two labels are supplied, unique to each package, and are so presented from the printers that the label applicators guide the package to align the two labels on opposite sides of the package.

6 Claims, 8 Drawing Figures

APPLICATION OF HUMAN READABLE AND MACHINE READABLE LABELS

CROSS-REFERENCE TO RELATED APPLICATIONS

This application is related to copending applications Ser. No. 573,594 and Ser. No. 573,597, all filed on the same date as this application and assigned to the same assignee.

BACKGROUND OF THE INVENTION

Both manual and automatic systems for weighing and labeling of random weight commodities are well known, and are in widespread use in supermarkets, meat markets, and large delicatessens. In general, the manual system comprises a computing scale which weighs each item, generates a weight code, and transfers this code to a computer into which an operator sets the price per unit weight (e.g., price per pound). The computer calculates the value by multiplying these two factors, and this information is transmitted to a labeling machine which prints a unique label for that item, such label containing human readable information identifying the weight, price per unit weight, value, and in many cases the type of commodity and some identification of the store. The printed label is ejected at a label applicator station where the package commodity can be pressed against the label to adhere it thereto, usually with a thermally activated adhesive on the label back. The label printer generally is provided with some sort of replaceable commodity identification printing plate which can easily be inserted in the printer, and a quantity of such plates are kept handy to the label printer so that an operator can easily interchange them when he is labeliing various different commodities at different times.

Automatic systems comprise these same elements, plus conveying mechanism and label applicator mechanism by means of which the items, usually coming from an automatic wrapping machine, are carried to and away from the scale platform and then past a label applicator station where the appropriate label is adhered to the corresponding item.

Recently, the Uniform Grocery Product Code Council has brought about adoption of a standard machine readable code for various items, particularly food items, which is known as the Universal Product Code (UPC). The version of the code used for random weight products, such as meat, poultry, produce, cheese or other delicatessen items, is known as the UPC number system 2, version A. Some details of a typical such code are described hereinafter, and further details are disclosed in publications entitled *Approaches to UPC Implementation*, published by Super Market Institute, Inc., copyright 1974, and *UPC Symbol Specification* Jan. 1975 (and other dates) published by Distribution Codes Inc., 401 Wythe Street, Alexandria, Virginia 22314 as administrator for the Uniform Product Code Council. The symbol includes both machine readable bar code and corresponding human readable numerals. The code is structured to provide for the identification of the number system, the identification of the commodity, a check or parity number to prevent erroneous read, and in the UPC number system 2 the value of the package being labeled.

The machine readable label, in preferred embodiments, is provided as a separate label which is adhered to the bottom of the package, enabling the operator at a check out counter to pass the machine readable label over a scanner which "reads" the code information. The value or total price information is transmitted to an electronic cash register at the check out station in order to provide a visual display as well as to add the price of the particular item to a customer's bill during check out procedures. The information may be utilized in other ways, such as transmitting it to an in-store computer memory for compliation of products sold, or total value of certain products sold, during a given time, and to provide various inventory information.

To assist the check out operator, it is desirable to locate the machine readable label in some way where it is easy to pass it directly over the check out scanner. A convenient arrangement is to locate the machine readable label on the bottom of the package directly opposite the human readable label applied to the top of the package. This may be done manually, through positioning by the weighing and labeling machine operator who applies the appropriate labels in sequence, or it may be done mechanically in connection with automatic wrapping and labeling equipment.

Thus, for each weighing land calculating operation for a given item, two labels may be produced, and these labels are preferably applied to different parts of the same package. Some of the information on both labels is the same, however, the form of information is different, i.e., human readable vs. machine readable marking. There is, therefore, a need for an integrated system which will quickly and accurately produce both labels for each random weight item, permit these labels to be applied at desired places on the itemed package, and assure that appropriate warnings are provided so that the operator, or the automatic machine, does not inadvertently omit one or the other of the labels.

SUMMARY OF THE INVENTION

The present invention thus relates to a total system for weighing and marking with labels various random weight articles, particularly food articles, by integrating into existing systems, which produces only a human readable label, an additional label printing device capable of printing in machine readable form a label that carries at least commodity and value representation. This is achieved by entering commodity identification code into the machine readable label printer, by supplying coded information as to product total price or value to both labeling printing machines, and by assuring through appropriate interlock connections that a new weighing operation cannot commence until the appropriate labels have been taken from each label printed for the previously weighed product. The labels are presented from the printers in such a manner that they may be applied to predetermined areas of the top and bottom of the package, thus the human readable label can act as a guide to moving the machine readable label past a scanner, even though the machine readable label is out of direct view of the check out cashier. Random weight items represent about one-fifth of the commodities passing through check out with a UPC scanning point-of-sale systems, labels properly printed with UPC symbols enable the cashier to read the necessary information as to these packages without having to manually key-enter the information at the check out station.

The primary object of the invention, therefore, is to provide an integrated weighing, computing and labeling system, including a weighing scale, a computer operable from weight information received from the scale to calculate the value of random weight items, and two label printers which print, respectively, human readable and machine readable labels, together with label applicators incorporated in each printer which act to align each package such that an appropriate unique set of labels for each random weight item is applied to predetermined and related areas on opposite sides of the package; to provide such a system in which commodity identification can readily be changed in both of the printers; and to provide such a system which is applicable to either manual or automatic label application to the package items.

Other objects and advantages of the present invention will become apparent from the following description, the accompanying drawings and the appended claims.

IN THE DRAWINGS

DESCRIPTION OF THE PREFERRED EMBODIMENT

Figure 1:
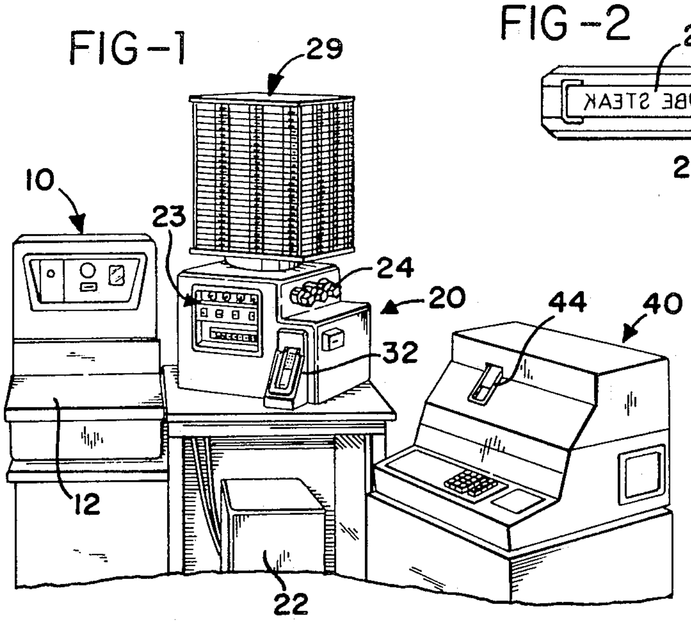
FIG. 1 is a perspective view of a typical system provided by the invention, set up for manual application of the printed labels to the packages.

The various units of a typical system employing manual handling of packaged food articles are shown in a convenient grouping in FIG. 1. A weighting scale 10 having a platform 12 provides a means for weighing articles such as wrapped or packaged foods, a typical package 14 being shown handled in FIGS. 4 and 5. The scale includes a means for providing a coded output representing the weight of the articles, indicated at 13 in FIG. 8. Details of the scale and its weight encoding apparatus are per se known, and may be, by way of example, of the type shown in U.S. Pat. No. 3,557,353.

A human readable label or ticket printer 20 is associated with the system. It receives the weight and value information from a first computer 22, along with other information representing the price per unit weight (e.g., price per pound) of the particular articles being weighed and labeled. This pricing information is supplied from manually operated apparatus 23 which may be incorporated in the printer and controlled by knobs 24, or by an equivalent keyboard.

Figure 2:
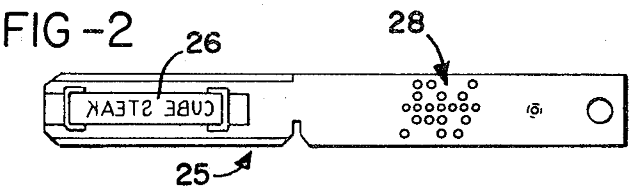
FIG. 2 is a view illustrating a commodity identification plate or key which contains commodity identification information both in human readable and coded form.

The label printer also includes a commodity key receptacle which receives a commodity identification key 25 (see also FIG. 2). This key includes a commodity identification printing plate 26 at one end, which is foremost inserted into the receptacle, and also coded identification 28 of the commodity nearer its center. This coded information may be in the form of a pattern of holes or transparent regions in an otherwise opaque key body, or in any other suitable form. Details of the printer 20 and its use of a commodity insert key are described in U.S. Pat. No. 3,104,806 issued Sept. 24, 1963, and details of such a key with coded information are disclosed in copending application Ser. No. 573,594 filed Apr. 30, 1975. A quantity of keys 25 may conveniently be stored on top of printer 20 in a rack 29, such as described in U.S. Pat. No. 3,238,001 issued Mar. 1, 1966.

Figure 3:
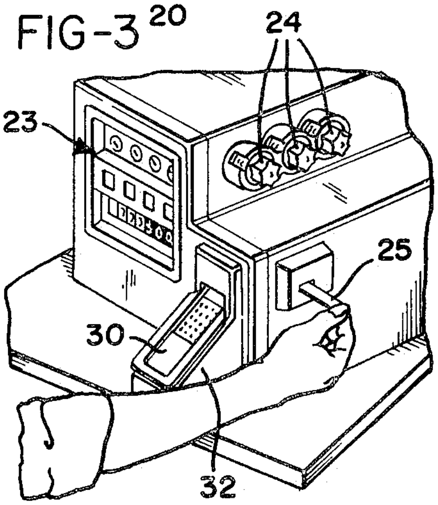
FIG. 3 is a perspective view of the first or human readable label printer showing the manner in which the key illustrated in FIG. 2 is interchanged.

As explained in detail in U.S. Pat. Nos. 3,104,806 and 3,557,353, the scale 10, computer 22, and printer 20 cooperate to calculate the value of a particular article of a commodity placed on scale platform 12. An appropriate commodity key 25 is previously inserted in the printer, and the price per unit weight for such commodity is entered via knobs 24. The printer, at the end of the value calculation, prints a human readable label 30 (FIG. 3) on which appears figures stating the weight, price per unit weight, and value of that particular article along with the name of the commodity. In many instances it is customary to use label stock which is pre-printed with the name of the store.

Figure 4:
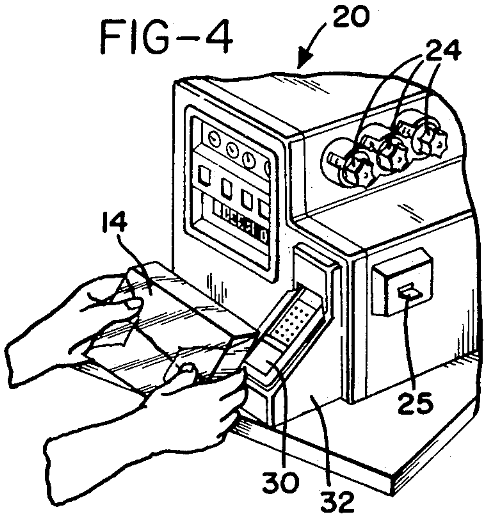
FIG. 4 is an illustration of application of a human readable label to a package.
Figure 5:
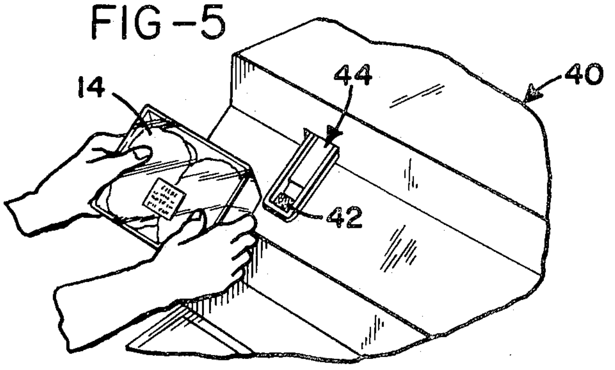
FIG. 5 is an illustration showing application of a machine readable label to the package.

The label 30 has a suitable adhesive on its reverse side, and is delivered with this adhesive side uppermost into an applicator chute or holder 32, which may be of the type disclosed in U.S. Pat. No. 3,556,898 issued Jan. 19, 1971. The ejector mechanism that contains chute 32 incorporates a switch (not shown) which is connected as part of an interlock control for the printers. If the label is not removed from the ejector, the interlock control prevents a second printing cycle. FIG. 4 illustrates an operator in the act of applying a label 30 to a package. It should be noted that the operator holds the package top down, with one edge parallel to the printer housing; and due to the length of the chute, the label 30 is attached to the package at a location which is spaced inward a predetermined distance from, and oriented to, that one edge of the package.

The system also includes a second label printer 40 which is adapted to print a machine readable label (UPC code) 42 and to deliver such label onto a chute 44. The printer mechanism may be of the type disclosed in U.S. Pat. No. 3,866,851 issued Feb. 18, 1975. The label delivery mechanism 44 including the chute and associated interlock switch (not shown) are essentially identical to the same apparatus as used in the printer 20, and details are disclosed in U.S. Pat. No. 3,866,851 as previously noted. The interlock switch of delivery mechanism 44 is also incorporated in the printer interlock control. Thus, unless labels are removed from both of the delivery mechanisms 32 and 44 after a printing cycle, both printers 20 and 40 are inhibited. Details of the interlock control are conventional, hence the interlock is shown schematically in FIG. 8.

Figure 6:
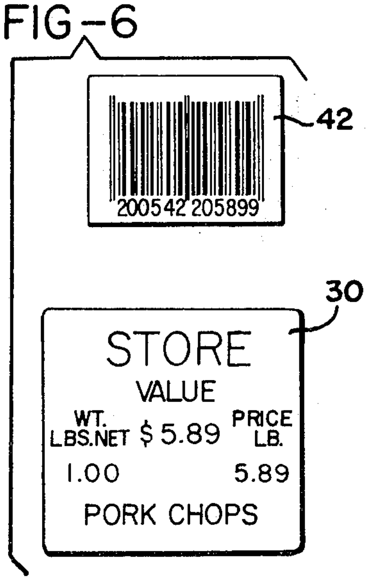
FIG. 6 is an illustration of the two labels, including the UPC symbol printed by the second or machine readable label printer.
Figure 8:
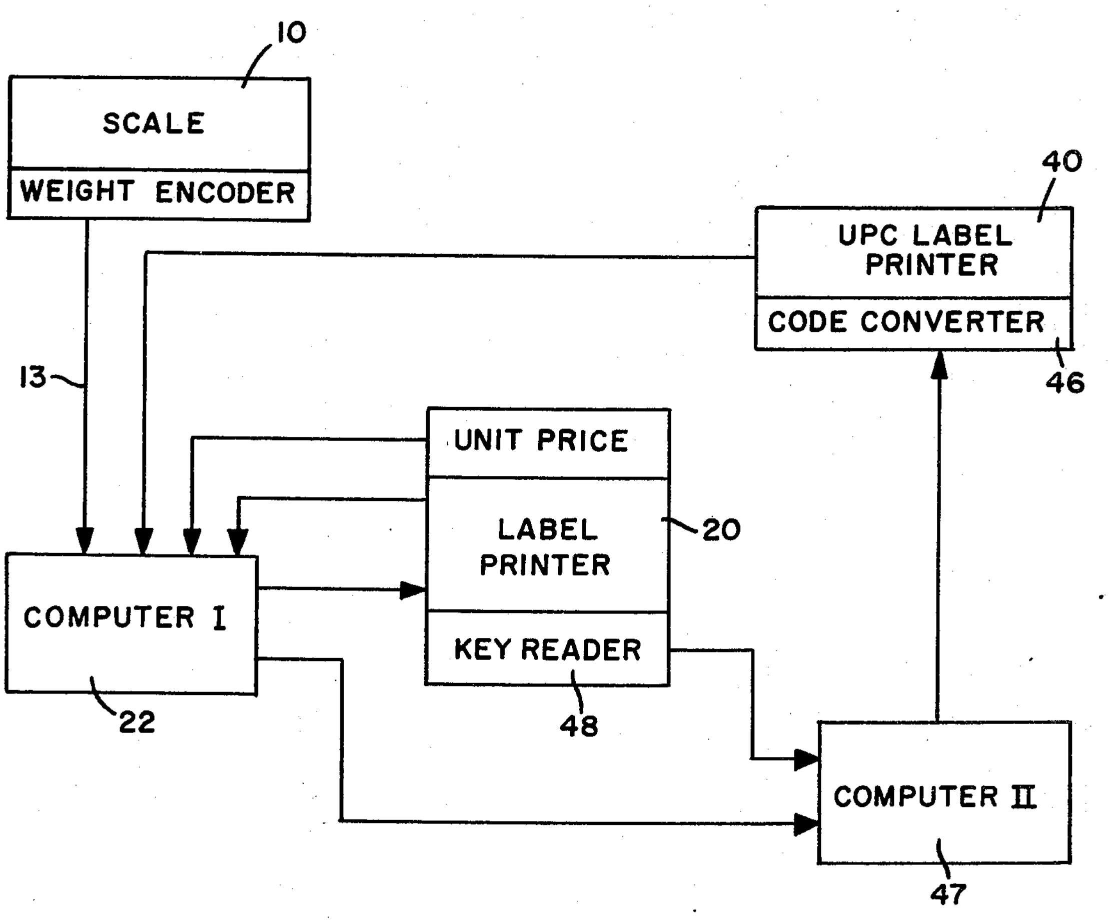
FIG. 8 is a block diagram illustrating the system arrangement.

The second printer 40 incorporates within its housing a code conversion unit 46 and a second computer 47, as indicated in FIG. 8. Coded weight information from the scale, price per unit weight entered manually, and value as calculated by computer 22 are all handled on a per se known basis, as more fully explained in U.S. Pat. No. 3,557,353. However, in this system it is also necessary to convert the total value information into a form suitable for printing the total value in UPC symbol or code where, as shown in FIG. 6, it appears along with identification of the commodity in UPC symbol. The code conversion unit also converts the commodity identification read and stored by the commodity key reader 48. That reader incorporates the key receptacle which is located in the side of printer 20. The reader functions as described in said copending U.S. application Ser. No. 573,594.

The label 42 thus presents in UPC code the commodity identification and the total value of the item to which the label is attached. In addition, this label includes a notation known as the number system designator, which identifies the number system used on that label. For random weight items in UPC, the designator is 2, and this distinguishes the entire code from other UPC codes. The final notation on label 42 is a check character; a number having a predetermined mathematical relation to the other numbers on the label. The manner in which the check character is derived and used is explained in the publication *Approaches to UPC Implementation*. Basically the check character allows determining whether the coded information has been properly read by a scanner, as at a check out station.

The second computer functions to calculate the check character from the total value and commodity identification codes, and to enter the check character via the code conversion unit 46. Thus, generation of the check character is a part of each weighing, calculating, printing and label application cycle.

Following through one complete operation, with reference to FIG. 8 which is a system block diagram, the operator performs the preliminary step of selecting and inserting the appropriate key 25. This locates the printing plate portion 26 within printer 20, and during the insertion step the key reader 48 enters the commodity identification code into the second computer 47. The operator enters the price per unit weight by turning knobs 24.

The operator then places an article of the commodity on scale platform 12. If the article is placed within a container such as a paperboard boat, its weight is first subtracted as tare weight in the usual manner. When the scale platter comes to rest, computer 22 multiples the weight code information then available by the price per unit weight to obtain total value. This value information is sent to printer 20 and to computer 47. Printer 20 prints a label 30 which is ejected into application position in chute 32. This label has the commodity identification printed on it from plate 26, the weight of the article in appropriate measure of weight, the price per unit of such weight measure, and the total value of the article in appropriate currency. The adhesive side of label 30 faces outward toward the operator.

Computer 47 calculates the check character, and the code conversion unit 46 converts the total value and commodity identification into UPC code, adds on the check character and supplies this information to printer 40. A label 42 is printed and ejected, adhesive side up, down chute 44.

The operator removes the packaged article from the scale platter and places a next article on the platter. The operator then orients the top of the package over with chute 32, preferably aligning one edge of the package along the front of the printer housing, then presses the package against label 30. By reason of the length of the chute, label 30 is adhered to the package at a predetermined distance from the one edge. Pressing the package against the chute 32 actuates the reset switch of that label delivery mechanism and removes one of the inhibitors in the interlock control.

Next the operator inverts the package, top for bottom and aligns the same one edge adjacent the housing of printer 40 over its delivery chute 44, and presses the package against label 42. This actuates the reset switch of the second label delivery and removes its inhibition in the interlock control. Since chute 44 is essentially identical to chute 32, the label 42 is applied to the bottom of the package at the same distance from the one edge of the package.

With the two labels removed from the chutes, the interlock is cleared and the weight of the next package will be read and a new read, compute and print cycle will begin. When the machine readable label 42 is scanned at a later time, for example in passing through a check out station, the location of the human readable lable 30 on top of the package serves as a guide to the clerk for aligning the label 42, invisible to him, and passing it over the scanner window or slot.

Figure 7:
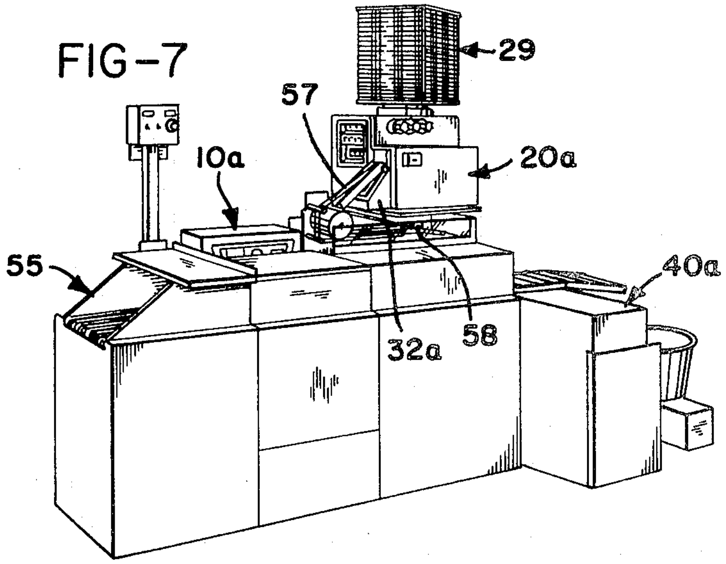
FIG. 7 is a perspective view of an automatic weighing and label printing-applicator system which may be used in conjunction with an automatic wrapping machine.

FIG. 7 illustrates an automated form of the invention. The scale 10*a* has its platform arranged as part of a conveyor system 55 and the first label printer 20*a* is mounted downstream of the scale. The label delivery chute 32*a* is connected to a conveyor 57 for the human readable labels, which delivers them to a label applicator mechanism 58. The printer 20*a* is of the same construction as printer 20, and includes the commodity key reader. The second printer 40*a* is located farther downstream in the package conveyor system and is arranged to present the machine readable labels to an applicator (not shown) which applies these labels to the underside of the packages.

Details of the conveying system 55 and the label applicators do not form a part of this invention, but are disclosed in copending U.S. application Ser. No. 573,597, filed April 30, 1975, and issued patents identified therein. The system diagram, FIG. 8, applies to the automated form of the invention, however, with the exception that label presence detectors in the mechanical applicators are utilized for interlock control signals rather than interlock switches in the label delivery chutes.

While the form of apparatus herein described constitutes a preferred embodiment of this invention, it is to be understood that the invention is not limited to this precise form of apparatus and that changes may be made therein without departing from the scope of the invention.

What is claimed is:

1. A label applicator for applying two labels bearing related information to opposite sides of random weight packages of a commodity, one of said labels having machine readable information thereon, comprising:

means for presenting a human readable first label for application to a predetermined region on a first side of the package, and means for separately presenting a machine readable second label for application to a second side of said package at a point which has a predetermined positional relation to said first label whereby the first label can be utilized as a guide to locate the position of the second label as the package is manipulated with the second side away from the person subsequently handling the package for machine reading of the second label.

2. A label applicator for applying two labels bearing related information to opposite sides of random weight packages of a commodity, the second of said labels having machine readable information thereon, comprising:

means for presenting a human readable first label for application to a predetermined region on a first side of the package, and means for separately presenting the second label for application to a second side of said package opposite the first side at a point which is along a line passing through said human readable label and directly through said package whereby the first label can subsequently be utilized as a guide to locate the position of the second label as the package is manipulated over a mechanical reading device with the second side away from the person handling the package.

3. A label applicator as defined in claim 2 wherein said means for presenting a first label includes a delivery chute of predetermined length at the end of which the first label is presented for attachement to a part of the package pressed against it, and said means for presenting the second label includes a like delivery chute at the end of which the second label is presented, whereby the package is similarly aligned but inverted during application of the second label.

4. Label preparing apparatus for weighed commodity packages comprising:

a weighing scale providing electrical weight signals responsive to commodity package weight;

means connected with said weighing scale for multiplying said electrical weight signals by price per unit weight signals to obtain total value signals;

means for supplying commodity identity information to the apparatus;

first printing means for printing, in human readable form, an indication of said total value signals and an indication of commodity identity according to said commodity identifying information on a first label;

second printing means for printing, in machine readable form, an indication of said total value signals and an indication of commodity identity according to said commodity identifying information on a second label; and means connected to each of said printing means and operable to present the respective labels at predetermined locations and in predetermined positions such that the two labels can be applied to opposite sides of a package in alignment, whereby the first label can function on the package as a guide to the location of the second label on the opposite side of the package.

5. Apparatus as defined in claim 4, wherein said means to present the labels includes separate label ejection chutes extending from each of said printing means, label applicators associated with each of said chutes and operable to receive labels from the respective chutes and to apply the first and second labels to the top and bottom, respectively of a package, and conveyor means constructed and arranged to move the packages past said label applicator.

6. A method of applying to opposite sides of a package a human readable label and a related machine readable label, comprising the steps of first applying one of said labels to a predetermined location on one side of the package and then applying the other of said labels to the package substantially opposite the one label such that the position of said human readable label provides an indication of the position of said machine readable label when said machine readable label is not visible to a person presenting the machine readable label on the package to a label scanning device.

* * * * *